United States Patent [19]

Weber et al.

[11] 4,389,043

[45] Jun. 21, 1983

[54] METALLURGICAL MELTING AND REFINING UNIT

[75] Inventors: Ralph Weber, Sao Paulo, Brazil; William Wells, Charlotte, N.C.

[73] Assignee: Korf Industrie und Handel GmbH und Co KG, Baden-Baden, Fed. Rep. of Germany

[21] Appl. No.: 276,362

[22] PCT Filed: Dec. 19, 1980

[86] PCT No.: PCT/EP80/00151

§ 371 Date: Jun. 16, 1981

§ 102(e) Date: Jun. 16, 1981

[87] PCT Pub. No.: WO81/01862

PCT Pub. Date: Jul. 9, 1981

[30] Foreign Application Priority Data

Dec. 21, 1979 [DE] Fed. Rep. of Germany ....... 2951825
Dec. 21, 1979 [DE] Fed. Rep. of Germany ....... 2951826

[51] Int. Cl.³ .............................................. C21B 3/00
[52] U.S. Cl. ........................................ 266/218; 75/60
[58] Field of Search ............. 266/218; 75/60, 10 R–12

[56] References Cited

U.S. PATENT DOCUMENTS 3,902,889 9/1975 Malin ..................................... 75/60
3,999,977 12/1976 Kolb ..................................... 75/60

*Primary Examiner*—P. D. Rosenberg

[57] ABSTRACT

Figure 3:
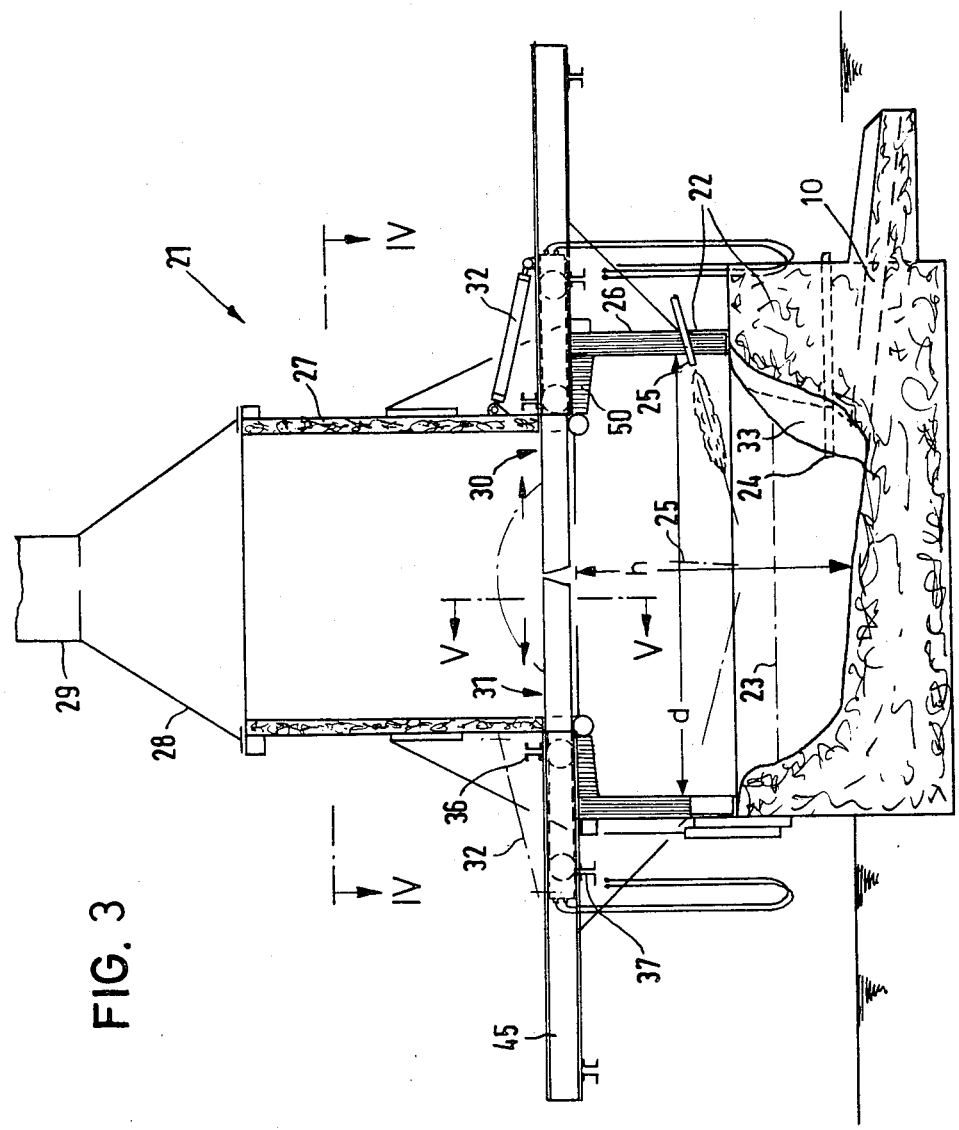

Metallurgical melting and refining unit (21) with which scrap steel, sponge iron, solid and molten pig iron can be processed in any desired ratio of admixture, and coal, oil, gases or electrical power can be used as energy source. For this purpose, and with an eye to low investment costs, the furnace vessel (22) is made in the form of a round hearth furnace with a ratio of the inside dimensions diameter (d) to height (h) of the furnace vessel between 0.8 and 2.5, and one tuyere bench (33) is provided on each side of the tap hole (10), for primary tuyeres which discharge below the melt surface. Furthermore, two tuyeres (25) discharge into the furnace vessel above the melt surface and are constructed as burners. The charge material can be preheated and charged in a controlled manner by a scrap preheater (27) whose floor consists of gas-permeable grate parts (30, 31) which can be opened from the center. (FIG. 3)

14 Claims, 6 Drawing Figures

METALLURGICAL MELTING AND REFINING UNIT

The invention relates to a metallurgical melting unit in accordance with the generic part of claim 1.

Steel is produced in the Siemens-Martin furnace, in the converter or in the arc furnace, depending on the starting material available and, to some extent, on historical factors.

In the European region, the Siemens-Martin furnace has largely been replaced by the converter, which operates considerably more economically. One disadvantage of the converter is its high investment cost. When a Siemens-Martin furnace is to be replaced by a converter, the sheds must also be rebuilt, since they do not have the head room required for converters. Furthermore, the melting of any relatively large amount of scrap in the converter has presented difficulties. This problem is addressed, for example, in DE-OS No. 2,729,982.

The arc furnace is not well suited for the use of molten pig iron. Also, the energy costs are high, the electrical energy is not always available in the desired amount.

It is the object of this invention to make available a melting unit which will be universal in regard to charging material and energy sources, and which will be characterized by low investment costs. This melting unit is to be able to replace Siemens-Martin furnaces in existing steelworks, and is to be suitable for the processing of any desired mixtures of scrap, sponge iron, and solid and molten pig iron. Furthermore, when a preheater is used for preheating the material used for charging such a universal melting unit, the assurance is to be provided that, when the input material is charged into the furnace vessel, the primary and secondary tuyeres opening into the vessel are protected against mechanical damage so that these tuyeres can remain operative.

Setting out from a melting unit of the kind disclosed, for example, by U.S. Pat. No. 3,859,078, this object is accomplished by the features of claim 1.

Advantageous further developments of the invention are to be found in the subordinate claims.

In comparison to the Siemens-Martin furnace, the operating costs of the melting unit of the invention are lower, a more rapid charging of scrap is possible, the production per unit of time is increased, and the energy costs are reduced. It is possible at modest investment cost to replace the Siemens-Martin furnace of existing steelworks with the melting unit of the invention.

In comparison to arc furnaces, a greater charge of molten pig iron is possible, being able to amount to as much as 90% of the charge, the energy costs and investment costs are lower, and the carbon content can be lowered in a simple manner in the production of a low-carbon steel. In combination with arc electrodes, the melting unit is even more flexible in application. The power supply does not need to be designed for the peak level, but can be limited to a medium level, because other power sources can be used along with them.

In comparison to the converter, a higher scrap content can be used, the investment costs are substantially reduced, and a better utilization of power is possible. Furthermore, a continuous process is possible, analyses can be taken during the process, and, by varying the process conditions and adding finely granular solids through the tuyeres, the desired end product can be obtained. Alloy steels of the desired composition are easier to make than in the converter or in the arc furnace.

In the melting and refining unit of the invention, suitable charge materials are solid pig iron, molten pig iron, scrap and sponge iron in any desired admixture. Oil or coal or gas or electrical power can be used as energy sources. If the melting unit is constructed without electrodes, the required shed height is low. The unit is easy to replace, repair and charge. On account of the low investment costs, existing steelworks can easily be re-equipped with other melting units, and can be adapted to changing conditions in the charge material or in the energy supply. The melting and refining unit also is easy to equip with a preheater for the charge material. The danger of damage to the tuyeres by falling pieces of charge materials, especially large pieces of scrap, when the furnace is being charged, which danger is due to the shape of the furnace vessel, can be eliminated by making the grid that forms the bottom of the preheater in several parts opening from the center. This permits control of the charging operation and assures that the pieces of scrap will fall substantially in the central area, and will thus be unable to damage the tuyeres.

Figure 1:
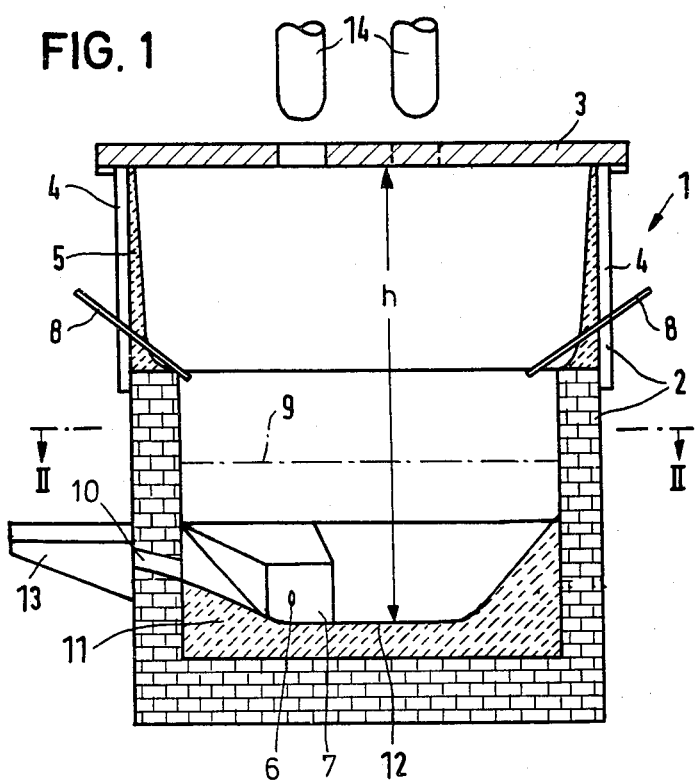
Figure 4:
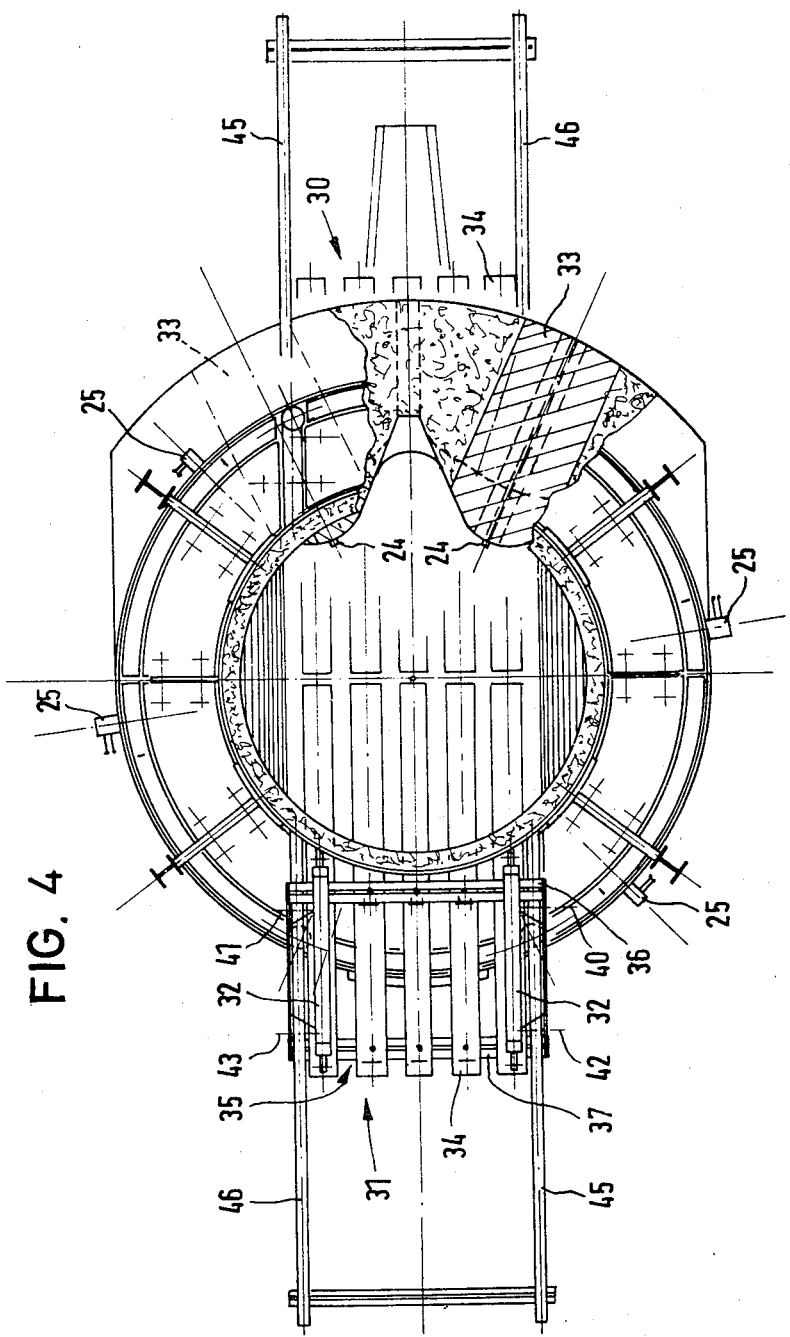
Figure 5:
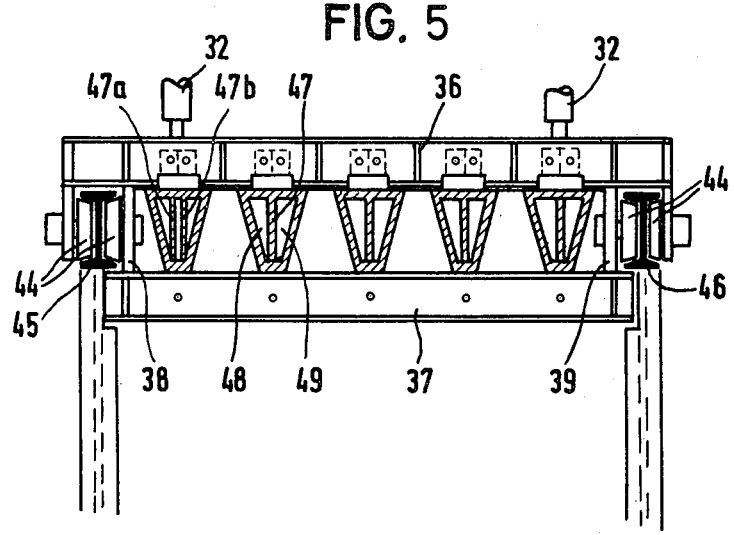
Figure 6:
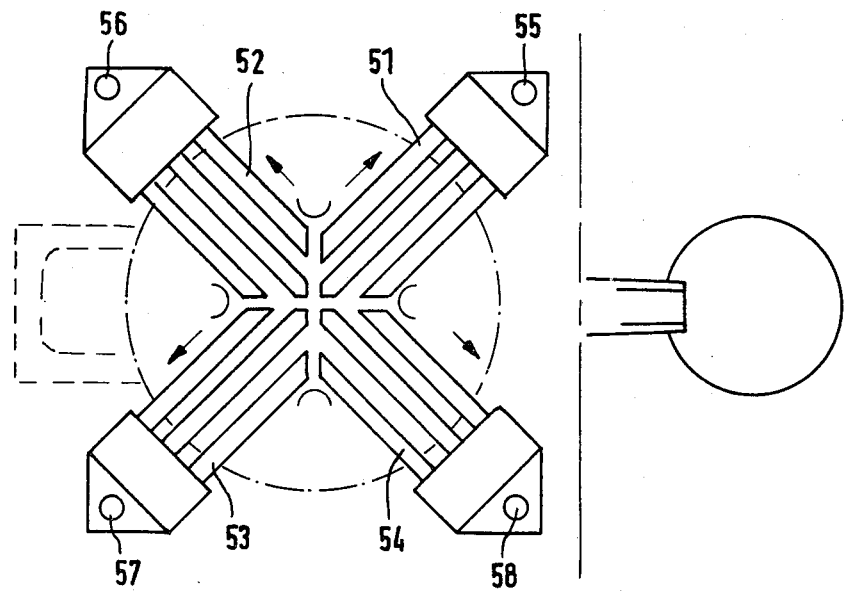

The invention is further explained by two embodiments in conjunction with six figures. Diagrammatically, FIG. 1 shows a longitudinal section and FIG. 2 a cross section of a first embodiment of a melting and refining unit of the invention;

FIG. 3 shows a longitudinal section of a second embodiment;

FIG. 4 a partially cut-away representation of the sectional view IV—IV of FIG. 3;

FIG. 5 the grate in the sectional view V—V of FIG. 3;

FIG. 6 diagrammatically, an arrangement of four grate parts displaceable in relation to one another.

Figure 2:
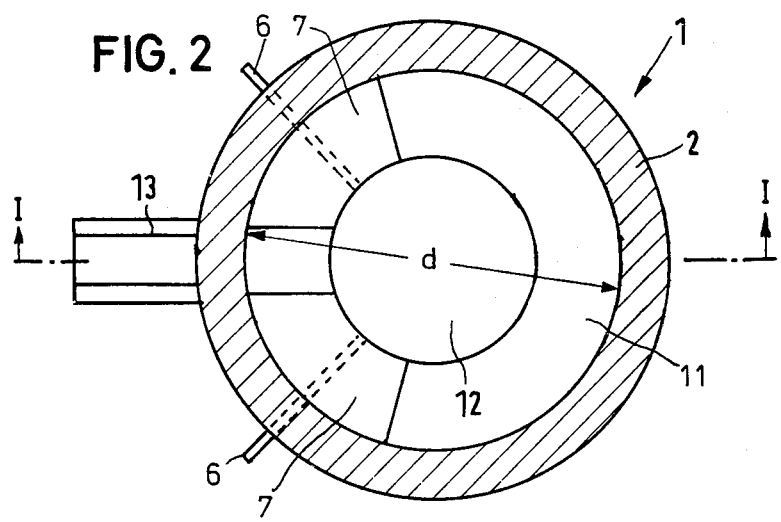

The metallurgical melting unit 1 corresponding to FIGS. 1 and 2 for the production of steel from molten pig iron and/or scrap and/or sponge iron is constructed as a round furnace, i.e., as a furnace vessel 2 of approximately circular cross section in the interior, having a swing-away cover 3. The ratio of the inside dimensions diameter d to height h of the furnace vessel is between 0.8 and 2.5 preferably between 1.0 and 2.0. The furnace vessel is of brickwork in the lower portion, and in the upper portion the wall is formed in a known manner by water cooling compartments 4 protected on the furnace interior side by a refractory composition 5. In comparison with conventional arc furnaces with water cooling compartments, as described, for example, in DE-AS No. 2,659,827, in the present case the brickwork is drawn slightly higher, since tuyeres are provided through which oxygen-containing gases and fuels are injected. There are two types of tuyeres present. Primary tuyeres 6 for the injection of oxygen-containing gases are disposed each in a bench 7 of refractory material on the bottom of the furnace vessel 2, with a horizontal or slightly downwardly sloping axis. They discharge into the furnace vessel below the surface 9 of the melt, namely at a height of approximately 10 to 20 cm above the furnace floor 12 formed by the refractory lining 11. These tuyeres consist, for example, in a known manner, of at least two concentric tubes with a central passage for oxygen or oxygen-containing gas, and annular passages concentrically surrounding the central passage, for a protective fluid such as propane, oil etc. These passages are connected by pipelines to corresponding sources of oxygen or protective fluid (not shown). On either side of the tap pole 10 there is provided a tuyere bench 7 in which the tuyeres 6 are carried approximately radially inwardly. This assures not only a thorough mixing of the melt, but also produces a high temperature ahead of the tap hole 10, so that incrustation of the tap hole outwardly from the furnace interior cannot occur.

Secondary nozzles 8, constructed as burners, are carried through the wall of the furnace vessel 2 above the melt surface 9 indicated by a dash-dotted line. A fuel, such as oil or coal dust, and an oxygen-containing gas or oxygen are delivered to them from suitable sources through connecting pipelines. If oxygen is supplied in an excess, it is possible with these tuyeres to achieve an afterburning of combustible gases rising in the furnace vessel. Also, additive substances, if needed, can be injected through the primary and/or secondary tuyeres. The spout of the furnace vessel is indicated at 13 and arc electrodes which can be inserted through the cover are indicated at 14.

The metallurgical melting and refining unit 21 represented in FIGS. 3 and 6 contains a furnace vessel 22 into which the primary tuyeres 24 discharge below the melt surface indicated by a dash-dotted line 23, and into which secondary nozzles 25 discharge above the melt surface, the secondary nozzles being carried through the wall of the furnace vessel 22 at four points on its circumference. While the bottom part of the furnace vessel 22 is bricked and covered with refractory material, the upper, recessed wall section 26 is formed of sector-shaped water cooling boxes.

Above the furnace vessel 22 there is disposed a preheater 27 for preheating the material to be charged into the melting and refining unit, being in the present case a scrap preheater having a hood 28 connecting it to an exhaust gas stack 29. The preheater has a capacity for a full charge of the furnace vessel.

The floor of the scrap preheater 27 is formed by a grate composed of two parts 30 and 31, which are of identical construction and can be moved inwardly and outwardly by hydraulic cylinders 32. A charge of scrap for the furnace vessel can be held by the grate parts when they are in the inner position, and is preheated to the desired temperature by the hot exhaust gases developing during the process in the furnace vessel. By retracting the grate parts 30 and 31 by means of the hydraulic cylinders 32, the furnace vessel can be charged with scrap preheated to 800° to 1000° C., so that the energy required for the preheating of a charge of scrap is saved. Since at first, when the grate parts 30 and 31 are drawn apart, a gap is formed in the center and widens, the scrap drops controlledly from the preheater into the furnace vessel. The size of the opening is controllable. By this controlled charging of the scrap into the furnace vessel, mechanical damage to the two tuyeres 25 can be largely prevented. The primary tuyeres 24 are, for this purpose, and to assure long life, embedded in a bench 33 of refractory material provided on the floor of the furnace vessel 22. This bench can reach virtually to the center of the furnace vessel 22 constructed as a round furnace. It has proven advantageous, however, to make the furnace vessel bulge outwardly at the location of this tuyere so as to be able here to provide a bench or a brickwork embankment of sufficient length (see in the axial direction of the tuyeres 24).

One tuyere bench 33 is formed on each side of the tap hole 10 (see FIG. 4).

The hood 28 can be withdrawn laterally on the furnace staging or raised upwardly for charging. The exhaust gas stack is designed as a Venturi stack through which the exhaust gases are drawn from the furnace vessel through the scrap preheater. A heat exchanger can be provided in the exhaust gas stack, and used for preheating the gases required for the process in the melting vessel, especially combustion air.

As the sectional views of FIG. 3 shown in FIG. 4 and FIG. 5 show, each of the grate parts 30 and 31 contains a plurality of parallelly disposed grate bars 34 which are held in a frame 35. The frame 35, as seen from the center of the furnace, is composed of an upper, forward crossbeam 36, a lower, rear crossbeam 37, and two lateral girders 38 and 39. At points 40 to 43 on the lateral girders (see FIG. 4), pairs of wheels 44 are mounted, which are carried by rails 45 and 46, respectively. By means of the hydraulic cylinders 32, which are linked at one end to the stationary scrap preheater 27 and at the other end to the frame 35, the frame can be moved along the rails 45 and 46, provision being made by configuring the rails as I-beams, such that the forces exerted by the charge material through the grate bars on the frame 35 can be accommodated by the rails 45 and 46.

The grate bars 34 fastened in the frame 35 have each a trapezoidal, downwardly tapering cross section, and contain passages for the coolant. In the embodiment represented, the grate bars are hollow and reinforced internally by a vertical web 47 which extends lengthwise of the grate bars but not all the way to the end, so that two passages 48 and 49 are formed which communicate with one another at the end of the grate bars pointing toward the interior of the furnace. At the other end of the grate bars, coolant is fed into the one passage and removed from the other. Also, two longitudinal webs 47a and 47b can be provided in the interior of the grate bar, as indicated in the case of one grate bar in FIG. 5. In this case the coolant is best fed in through the central passage and returns through the two outer passages. This assures that the grate bars are cooled uniformly on both sides and most intensely in the area under the greatest thermal stress.

To prevent the hot gases arising from the melting vessel from escaping between the grate bars, profiled plates are provided at the point where the grate parts 30 and 31 pass through the wall of the scrap preheater, and close the open interstices between the individual grate bars. Such plates can be placed, for example, on the water-cooled upper marginal area 50 of the furnace vessel, and can have trapezoidal shapes of upwardly tapering cross section which engage in the interstices between the grate bars.

Another system for a grate is represented diagrammatically in FIG. 6. Here, four grate parts 51 to 54 are offset at 90° from one another and are displaceable in the axial direction by means of pins 55 to 58.

Suitable charge materials are especially scrap and/or sponge iron, and the preheater 27, and especially the grate parts 30 and 31, should be constructed according to the charge materials used.

Although in the above-described embodiments the grate parts are of longitudinally displaceable design, an opening and closing of the grates can also be brought about by a tilting movement of these grate parts. The grate parts do not have to be aligned with one another. For example, they can be slightly downwardly inclined toward the center of the melting unit. Furthermore, it is advantageous as regards the versatility of the melting and refining unit if the entire preheater can travel or swing horizontally to release the furnace vessel.

We claim:

1. Metallurgical melting and refining unit having a furnace vessel with a bottom and sidewall, two primary tuyeres extending through said sidewall and having a horizontal axis, and discharging below the surface of the melt in the vessel, said tuyeres being disposed in benches of refractory material on the bottom of the furnace vessel, at least one secondary tuyere extending through said sidewall and discharging above the melt surface, and a tap hole for the melt in the bottom area of the furnace vessel, said furnace vessel being in the form of a round hearth furnace, with a ratio of the inside dimensions diameter (d) to height (h) of the furnace vessel between 0.8 and 2.5, said tuyere benches being located on opposite sides of the tap hole and adjacent thereto, said vessel bulging outwardly in the area of said tuyere benches, and said tuyere benches being offset outwardly in axial direction of said primary tuyeres.

2. Melting and refining unit of claim 1, comprising a swing-out cover at said furnace vessel.

3. Melting and refining unit of claim 2, comprising electrodes adapted to be lowered and raised through said cover.

4. Melting and refining unit of claim 1, wherein the angle of inclination of the axis of the primary tuyeres from the horizontal amounts to no more than 20°.

5. Melting and refining unit of claim 1, wherein each primary tuyere consists of at least two concentric tubes with a central passage for oxygen or oxygen-containing gas and an annular passage for a protective fluid.

6. Melting and refining unit of claim 1, wherein said secondary tuyere is in the form of a fuel-and-oxygen burner.

7. Melting and refining unit of claim 1, wherein the ratio of the inside dimensions diameter (d) to height (h) of the furnace vessel is between 1.0 and 2.0.

8. Metallurgical melting and refining unit having a furnace vessel with a bottom and sidewall, two primary tuyeres extending through said sidewall and having a slightly downwardly inclined axis, and discharging below the surface of the melt in the vessel, said tuyeres being disposed in benches of refractory material on the bottom of the furnace vessel, at least one secondary tuyere extending through said sidewall and discharging above the melt surface, and a tap hole for the melt in the bottom area of the furnace vessel, said furnace vessel being in the form of a round hearth furnace, with a ratio of the inside dimensions diameter (d) to height (h) of the furnace vessel between 0.8 and 2.5, said tuyere benches being located on opposite sides of the tap hole and adjacent thereto, said vessel bulging outwardly in the area of said tuyere benches, and said tuyere benches being offset outwardly in axial direction of said primary tuyeres.

9. Melting and refining unit of claim 8, wherein the primary tuyeres of the two tuyere benches are disposed at an acute angle symmetrically to the tap hole and point approximately at the central axis of the furnace vessel.

10. Melting and refining unit of claim 1, comprising a preheater having a bottom disposed above the furnace vessel, for preheating input material, said preheater bottom being formed by a grate which can be closed and opened and through which, in the closed state, the exhaust gases of the melting vessel can flow into the preheater, said grate having a plurality of grate parts adjoining one another in the center of the melting unit in the closed state.

11. Melting and refining unit of claim 10, comprising two opposite grate parts which are movable toward and away from one another.

12. Melting and refining unit of claim 10, comprising four grate parts each offset at 90° and which are each movable backward and forward in axial direction.

13. Melting and refining unit of claim 10, wherein the entire preheater for preheating the charge material is disposed so as to be able to travel or to swing laterally.

14. Metallurgical melting and refining unit having a furnace vessel with a bottom and sidewall, two primary tuyeres extending through said sidewall and having a horizontal axis, and discharging below the surface of the melt in the vessel, said tuyeres being disposed in benches of refractory material on the bottom of the furnace vessel, at least one secondary tuyere extending through said sidewall and discharging above the melt surface, and a tap hole for the melt in the bottom area of the furnace vessel, said furnace vessel being in the form of a round hearth furnace, with a ratio of the inside dimensions diameter (d) to height (h) of the furnace vessel between 0.8 and 2.5, said tuyere benches being located on opposite sides of the tap hole and adjacent thereto, and a preheater having a bottom disposed above the furnace vessel, for preheating input material, said preheater bottom being formed by a grate which can be closed and opened and through which, in the closed state, the exhaust gases of the melting vessel can flow into the preheater, said grate having a plurality of grate parts adjoining one another in the center of the melting unit in the closed state.

* * * * *